United States Patent [19]
Otani et al.

[11] Patent Number: 6,082,016
[45] Date of Patent: Jul. 4, 2000

[54] CUTTING EDGE MEASURING DEVICE FOR MACHINE TOOL

[75] Inventors: Atsushi Otani; Akira Kosho, both of Abiko, Japan

[73] Assignee: Hitachi Seiki Co., Ltd., Chiba, Japan

[21] Appl. No.: 09/081,830

[22] Filed: May 20, 1998

[30] Foreign Application Priority Data

May 20, 1997 [JP] Japan .................................. 9-129395

[51] Int. Cl.[7] .................................................. G01B 21/22
[52] U.S. Cl. ............................................... 33/642; 33/628
[58] Field of Search ............................ 33/201, 533, 613, 33/628, 632, 636, 638, 639, 642, 645; 408/23, 35

[56] References Cited

U.S. PATENT DOCUMENTS

| | | | |
|---|---|---|---|
| 2,493,332 | 1/1950 | Aubin | 33/628 |
| 2,533,024 | 12/1950 | Lustrik | 33/639 |
| 2,665,492 | 1/1954 | Freimark | 33/639 |
| 3,614,909 | 10/1971 | Neuser | 33/628 |
| 4,532,716 | 8/1985 | Steiner | 33/628 |
| 5,358,364 | 10/1994 | Kall | 33/638 |

FOREIGN PATENT DOCUMENTS

| | | |
|---|---|---|
| 5-9804 | 2/1993 | Japan . |
| 6-39686 | 2/1994 | Japan . |

*Primary Examiner*—G. Bradley Bennett
*Attorney, Agent, or Firm*—Liniak, Berenato, Longacre & White

[57] ABSTRACT

A cutting edge measuring device is disclosed, which is simple and small-sized in its construction. The cutting edge measuring device comprises: an arm 13 provided on a headstock 7 and movable between the retracting position A at which the arm does not interrupt a workpiece chucked in a main spindle and the working tool T and the measuring position at which measurement of the cutting edge is carried out; sensors 14*a* provided on the arm 13 and detecting the cutting edge position at an offset position from the axis of the main spindle with contacting or non-contacting fashion so as to transmit detecting signals; and positioning means 15, 27*b*, 28*b* for positioning and retaining the arm 13 at the measuring position B. By this arrangement, the cutting edge measuring device ensures measurement of the cutting edge while a workpiece is chucked in the main spindle.

10 Claims, 3 Drawing Sheets

CUTTING EDGE MEASURING DEVICE FOR MACHINE TOOL

BACKGROUND OF THE INVENTION

1. Field of the Invention

The present invention relates to a cutting edge measuring device for machine tool, and more particularly relates to a cutting edge measuring device which can be used for measuring a cutting edge position of tools while a workpiece is being gripped by a chuck provided in a main spindle of the machine tool.

2. Prior Art

Heretofore, there has been increasing demands on improvement of the accuracy for finished products. However, when improving the accuracy of the products, there exist various problems such as thermal distortion due to heat generated upon cutting and processing operations of a workpiece to be produced and tool abrasion. For this reason, cutting edge position of the tool displaced by thermal distortion or tool abrasion must be precisely detected and then compensation must be made for precise positioning of the cutting edge.

Various cutting edge measuring devices have been proposed such as shown in Japanese Laid-open Utility Model Publication No. 5-9804 and Japanese Laid-open Patent Publication No. 6-39686. These devices ensure measurement of a cutting edge of tools without interrupting a workpiece chucked in the main spindle of the machine tool.

However, the cutting edge measuring device disclosed in Japanese Laid-open Utility Model Publication No. 5-9804 has several drawbacks in that the operational performance of the device is insufficient and in that the measurement of a cutting edge position is not accurate. Because of the position where the cutting edge measuring device is provided and the stroke movement (numerical controlled) of the tool to the X-axis direction at the processing point, in this measuring device, measurement of a cutting edge position is carried out for the tool (provided on a tool rest through a turret) which positions oppositely to the working tool and is away from the cutting and processing position. Also in this arrangement, it is difficult for an operator to watch the measuring position where the detecting head of the cutting edge measuring device is contacting to the cutting edge of the tool, leading to deteriorated handling operation.

The cutting edge measuring device disclosed in Japanese Laid-open Patent Publication No. 6-39686 includes a touch sensor which rotates around the chuck. Therefore, the measuring device is large-sized and complicated in its construction, leading to difficulty for maintenance. Also in this measuring device, the touch sensor is likely to suffer from chips or coolant splashing during machining.

With the foregoing drawbacks of the prior art devices in view, the present invention seeks to provide a simple and small measuring device for a cutting edge of the tools provided on the tool rest, and which ensures measurement of the cutting edge while a workpiece is chucked in the main spindle. Also the present invention seeks to provide a cutting edge measuring device for machine tool which excels in operational performance, measuring accuracy and handling operation, and which is not subject to chips or coolant splashing during machining operation.

SUMMARY OF THE INVENTION

According to the present invention, there is provided a cutting edge measuring device used for a machine tool, which machine tool includes: a main spindle perpendicular to or tilting at predetermined angles to the horizontal plane; a headstock rotatably mounting the main spindle and movable on a bed along the axis of the main spindle and the axis perpendicular thereto; a chuck provided at the lower end of the main spindle so as to grip a workpiece; and a tool rest provided on the bed under the chuck and having tools mounted thereon for cutting and processing the workpiece gripped by the chuck. The cutting edge measuring device comprises: an arm provided on the headstock and movable between the retracting position at which the arm does not interrupt the workpiece and the working tool and the measuring position at which measurement is carried out for the cutting edge of the tool; detecting means mounted on the arm and detecting the cutting edge of the tool at a position away from the axis of the main spindle with contacting or non-contacting fashion so as to transmit detecting signals; and positioning means for positioning and retaining the arm at the measuring position.

There is also provided the cutting edge measuring device as described above, characterized in that the arm is supported on the headstock so as to be movable around the axis perpendicular to that of the main spindle, and that the retracting position is near the headstock and the measuring position is near the tool rest.

There is further provided the cutting edge measuring device as described above, characterized in that the detecting means is located at the measuring position within the vertical plane including both the axis of the main spindle and the axis perpendicular thereto, and is away from the axis of the main spindle at a predetermined distance.

Additionally in accordance with the present invention, there is provided a cutting edge measuring device used for the machine tool as described above comprising: arm attachment member provided on the headstock in a position offset from the axis of the main spindle toward the tool rest; an arm attached to the arm attachment member and movable between the retracting position at which the arm does not interrupt the workpiece and the working tool and the measuring position near the tool rest at which measurement is carried out for the cutting edge of the tool; and detecting means provided on the arm at the end remote from the arm attachment member and detecting the cutting edge of the tool at a position away from the axis of the main spindle with contacting or non-contacting fashion so as to transmit detecting signals.

Other objects and features of the present invention will become apparent by reference to the following detailed description taken in conjunction with the accompanying drawings.

DESCRIPTION OF THE PREFERRED EMBODIMENT

Figure 1:
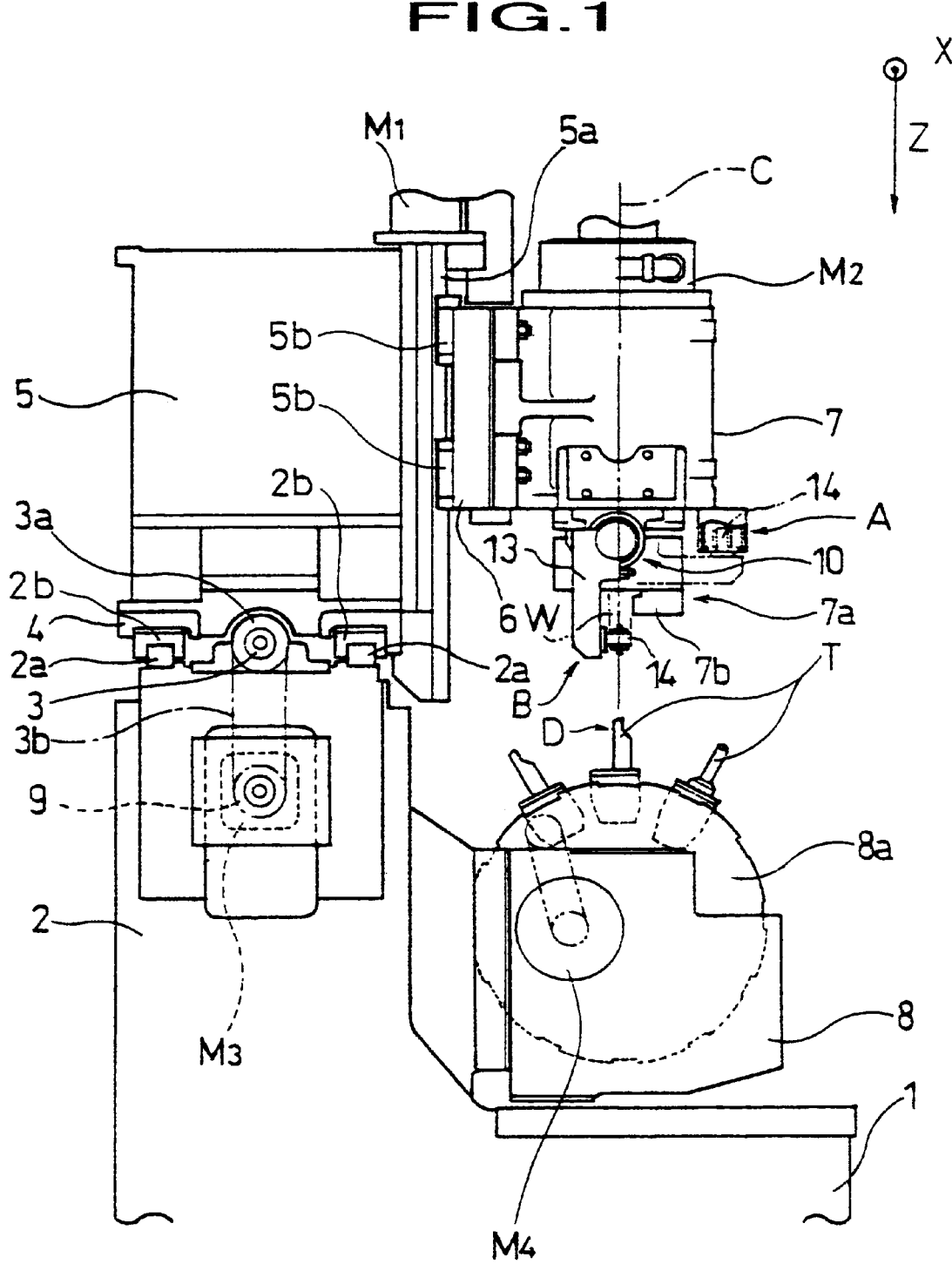
FIG. 1 is a side elevation view of a machine tool provided with a cutting edge measuring device according to the present invention.

Referring now to FIG. 1, a machine tool to which a cutting edge measuring device of the present invention is applied has a bed 1 and a rear bed 2 provided perpendicular to the horizontal plane of the bed 1 (left-hand side of the drawing). Two parallel guide rails 2a, 2a are provided at the top end of the rear bed 2 along the X-axis (transverse direction to the plane of the paper), which axis is perpendicular to the axis of a main spindle C (hereinafter described). Mounted slidably on the guide rails 2a, 2a are two slide bodies 2b, 2b through which a saddle 4 is attached, so as to enable to-and-fro movement of the saddle 4 in the X-axis direction. In this embodiment, the guide rails 2a, 2a and the slide bodies 2b, 2b provide a linear bearing guide. A screw shaft 3 is provided between the guide rails 2a, 2a with both ends rotatably supported at the top end of the rear bed 2 by a supporting member (not shown). At one end of the screw shaft 3, there is provided a toothed pulley 3a, which engages with another toothed pulley 9 by means of a toothed belt 3b. The toothed pulley 9 is attached to the output shaft of driving means M3. The driving means M3 may be a motor such as servomotor. The saddle 4 is provided with a non-shown nut, which is threadly engaging with the screw shaft 3, thereby providing a ball screw mechanism. In this arrangement, when the motor M3 is actuated and the screw shaft 3 is rotated, the saddle 4 together with the nut moves forward and backward along the guide rails 2a, 2a in the X-axis direction.

A sliding base 5 is integrally attached to the top end of the saddle 4. At one side of the sliding base 5 (right-hand side of the drawing), there is provided a guide rail 5a parallel to the Z-axis that is the axis of the main spindle C (hereinafter described). A cross slide 6 is attached to the guide rail 5a through slide bodies 5b, 5b, which are slidably engaging with the guide rail 5a, thereby providing a linear bearing guide. In this embodiment, the cross slide 6 is slidable by way of the linear bearing guide, however, other guide means such as slide guide may be applicable. Mounted at the other end of the cross slide 6 is a headstock 7, which rotatably supports a main spindle (not shown) with its axis aligned to the vertical plane of the machine tool. At the lower end of the main spindle, there is provided a chuck 7a having a jaw 7b for gripping a workpiece. The main spindle is rotated by driving means such as built-in type motor (main spindle motor) M2 assembled into the headstock 7. The chuck 7a may be of any known type such as wedge type, lever type and scroll type, and the jaw 7b is actuated to open or close by a chuck cylinder or driving motor (not shown). In this figure (FIG. 1), reference numeral M1 designates a motor (servomotor or the like) as driving means, which moves the headstock 7 upwardly and downwardly along the guide rail 5a in the Z-axis direction with the use of a drive transmission mechanism such as ball screw mechanism (not shown) provided at the sliding base 5. The output shaft of the motor M1 and the ball screw are directly connected by a connecting member (not shown).

At one side of the rear bed 2 (right-hand side of the drawing), there is provided a tool rest 8, which is further provided with a disk-like turret 8a. The turret 8a is indexed its position around the axis parallel to the X-axis (transverse direction to the plane of the paper) and is provided with a plurality of equi-spaced tools T along its peripheral plane. The index axis of the turret 8a is not limited to the X-axis direction. There may be other directions including the Z-axis as long as a required tool T is indexed to the cutting and processing position D.

In order to stock workpieces to be processed, there is provided a work stocker (not shown) adjacent to the bed 1, and with the movement of the headstock 7 in the X-axis direction a workpiece in the stocker is received to the chuck 7a.

Actuation of the motor M1, M2, movement of the saddle 4 and the like, indexing of the turret 8a and the like operations are controlled by a non-shown control unit (NC device) provided at one end of the bed 1.

In this embodiment, the machine tool has the main spindle aligned to the vertical plane. However, other machine tools may be applicable such as the type having a main spindle tilting at predetermined angles to the vertical plane.

Figure 2:
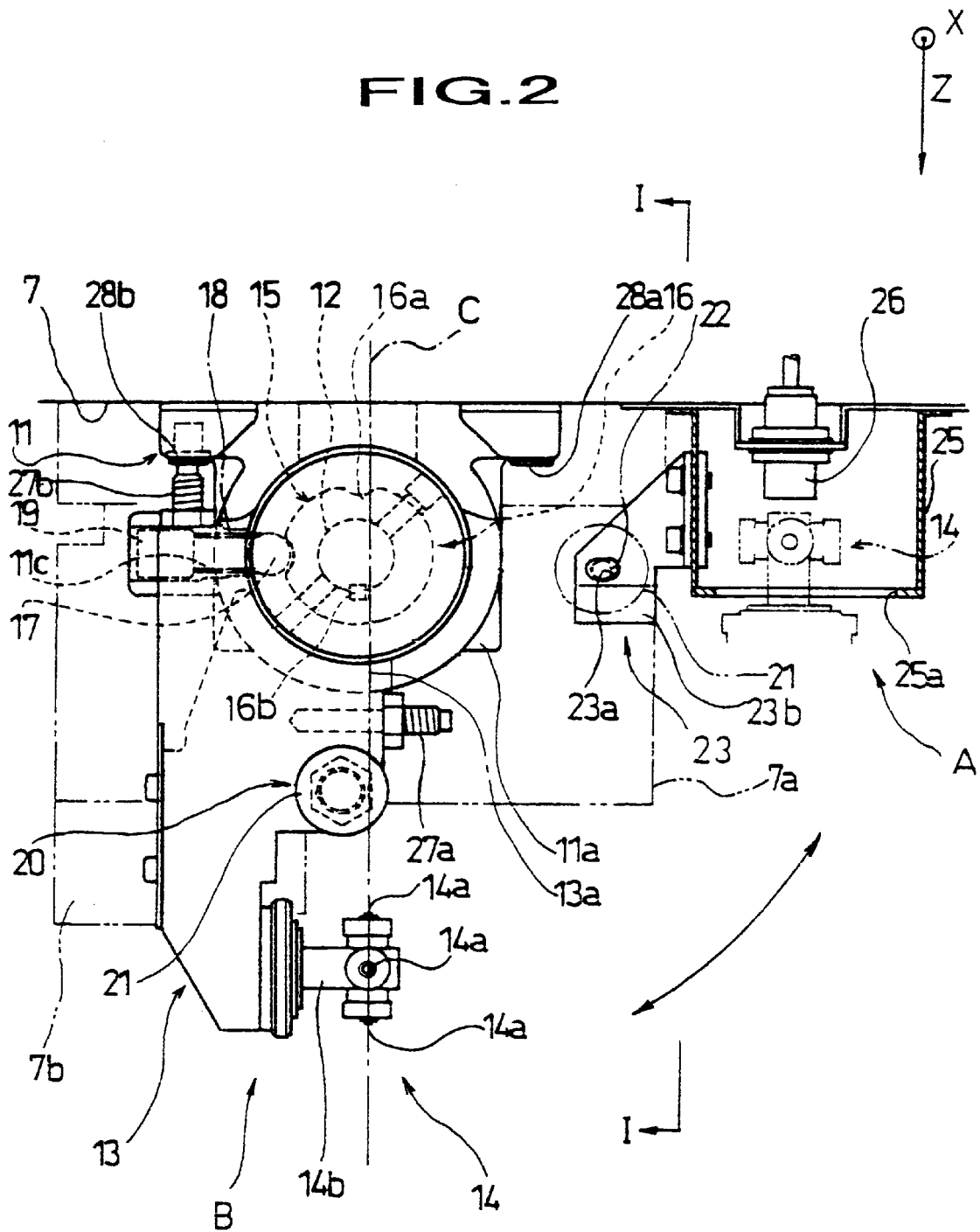
FIG. 2 is an enlarged detail of FIG. 1, showing a side elevation which explains the construction of the cutting edge measuring device.
Figure 3:
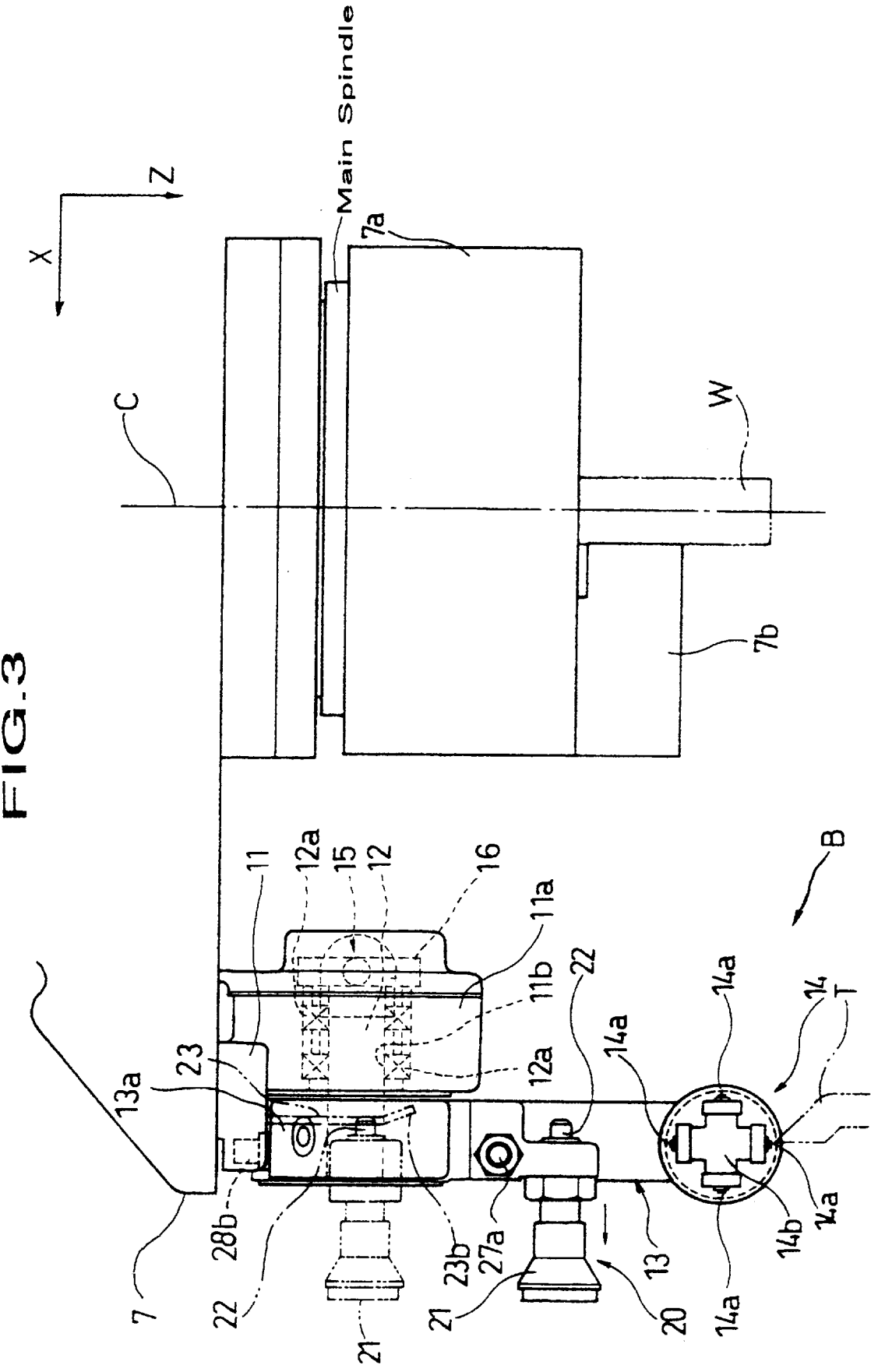
FIG. 3 is a sectional view taken along the line I—I of FIG. 2.

Referring now to FIGS. 2 and 3, construction of the cutting edge measuring device 10 according to the present invention will be described. For the purpose of illustration, in FIG. 2, the chuck 7a and the jaw 7b of the machine tool are shown in phantom.

The headstock 7 is provided with an arm attachment member 11 offset from the axis of the main spindle C toward the tool rest 8 and adjacent to the chuck 7a. The arm attachment member 11 has a support 11a at the lower end thereof, and the support 11a is provided with a through hole 11b which is parallel to the X-axis. Into this through hole 11b is inserted a shaft 12, which is rotatably journaled by bearings 12a, 12a. One end of the shaft 12 is extending from the through hole 11b and is fixed to an arm 13 with the use of any known means such as key and nut (not shown). With the rotational movement of the shaft 12, the arm 13 becomes movable between the retracting position A at which the arm 13 is turned toward the headstock 7 and the measuring position at which the arm 13 is turned toward the tool rest 8. In FIG. 2, the turning movement of the arm 13 is shown by arrows. In this embodiment, the arm 13 is shown as a linear member which is substantially parallel to the axis of the main spindle C.

The arm 13 is provided at its free end with a measuring portion 14 including detecting means such as sensors 14a. Sensors 14a are mounted on the arm 13 through a retaining portion 14b and transmit detecting signals when the contacting portion of each sensor 14a contacts with a cutting edge of tools T. Each contacting portion of the sensor 14a is positioned in the vertical or horizontal plane of the retaining portion 14b, therefore four touching portions of the sensors 14a are provided around the retaining portion 14b with each touching portion positioned at right angles with adjacent portions. Provision of a plurality of sensors 14a ensures selection of different sensors applied to depending on the tool T to be used. In this embodiment, since the headstock 7 moves forward and backward in the X-axis direction for receiving a workpiece W and then moves toward the cutting and processing position, when the arm 13 is in the measuring position B at which the arm 13 is turned toward the tool rest 8, the four sensors 14a must be in a position within the vertical plane including both the axis of the main spindle C and the X-axis. As shown in FIG. 3, at the measuring position B, the sensors 14a are positioned within the vertical plane including both the axis of the main spindle C and the X-axis (axis perpendicular to the axis of the main spindle C), and are away from the axis of the main spindle C at a distance more than the outer diameter of the chuck 7a.

Stoppers 27a, 27b are provided at a base portion 13a of the arm 13 for the purpose of positioning during the turning movement of the arm 13. One stopper 27a is for positioning the arm 13 at the retracting position A, while the other stopper 27b is for positioning the arm 13 at the measuring position B. The arm attachment member 11 has abutting portions 28a, 28b for abutting engagement with the respective stoppers 27a, 27b, whereby when the stopper 27a abuts against the abutting portion 28a, the arm 13 is positioned at the retracting position A, and when the stopper 27b abuts against the abutting portion 28b, the arm 13 is positioned at the measuring position B.

The shaft 12 is further provided with a notch mechanism 15 for retaining the arm 13 in the retracting position A and the measuring position B. The notch mechanism 15 comprises: a notched plate 16 fixed to the shaft 12 by a key 16b; arcuate notches 16a, 16a provided at an angle of 90° around the outer periphery of the plate 16; an engaging member 17 inserted into a through hole 11c, which is formed in the support 11a and is extending from the outer periphery of the support 11a, and movable toward and away from the arcuate notches 16a, 16a for engagement therewith; a compression coil spring (hereinafter referred to as spring) as urging means provided within the through hole 11c and imparting urging force so as to urge the engaging member 17 toward the notched plate 16; and a spring receiving portion 19 threadly inserted from the outer periphery of the support 11a into the through hole 11c so as to receive one end of the spring 18. When turning the arm 13 to the directions shown with the arrows (FIG. 2), the engaging member 17 is forced back to the through hole 11c against the urging force of the spring 18, thereby disengaging the engaging member 17 from the arcuate notch 16a.

With this notch mechanism 15, when the arm 13 is at the retracting position A or at the measuring position B, the engaging member 17 is in engaging relation with one of the arcuate notches 16a, and when the arm 13 is turned toward the retracting position A or toward the measuring position B, the arm 13 is imparted turning force by the urging action of the spring 18 through the notched plate 16.

Shapes of the notches 16a and the engaging member 17 are not limited to the illustrated embodiment. It is appreciated that various types of alternations may be employed for the notches 16a, such as V-shaped grooves or V-shaped holes, and the engaging member 17 may have any shape engaging with the notch 16a.

In this embodiment, positioning means consists of the stoppers 27a, 27b, the abutting portion 28a, 28b and the notch mechanism 15. Since the machine tool to which the cutting edge measuring device of the invention is applied has the downwardly-facing main spindle and the workpiece W is cut and processed by the tools T located below the chuck 7a, the machine tool is unlikely to suffer from chips or coolant. However, in this embodiment, protecting means 25 is provided at the retracting position A for protecting the measuring portion 14 from chips or coolant splashing during machining. The protecting means 25 as a splash guard is box-like shaped and has an opening 25a at its lower end so as to receive therein the measuring portion 14 when the arm 13 is turned to the retracting position A. At the protecting means 25, there is provided a proximity switch 26 as sensing means. The sensing means may be a limit switch, a photoelectric switch or the like. When the arm 13 is turned to the retracting position A, the measuring portion 14 moves into the protecting means 25 so as to detect the measuring portion 14, which has come into the position just below the switch 26, and transmit detecting signals. In other words, that is the retracting position A of the arm 13 which the proximity switch 26 detects the measuring portion 14 and transmits the detecting signals. Cutting and processing operations of the workpiece W by the predetermined tool T are controlled by the control unit (not shown) of the machine tool. The control unit carries out the operations on condition that the proximity switch 26 detects the measuring portion 14 and is transmitting the detecting signals. Since the measuring portion 14 is retracted within the protecting means 25 during machining of the workpiece W, the contacting portions of the measuring portion 14 are not subject to chips or coolant splashing during machining.

Operation of the machine tool can be suspended when the proximity switch 26 does not transmit the output signals, whereby the arm 13 and the tool T do not interrupt each other except for the measuring operation of the cutting edge position.

At the retracting position A, the arm 13 is hold by the notch mechanism 15, however, when exceptional force is applied due to vibration, impact or physical contact with the operator, the notch 16a and the engaging member 17 will be disengaged and then the arm 13 may be turned to the measuring position B, leading to suspension of the actuating machine tool. For this reason, arm restriction means 20 is further provided as restriction means so that the arm 13 is firmly hold at the retracting position A. In this embodiment, the arm restriction means 20 comprises: an engaging pin 22 provided at the arm 13 and displacing forward and backward to the direction perpendicular to the turning direction of the arm 13; means for urging the engaging pin, such as spring (not shown), so as to urge the engaging pin 22 off from the arm 13; a plate member 23 provided at the retracting position A and having an engaging hole 23a for engagement with one end of the engaging pin 22; and a handle 21 mounted on the other end of the engaging pin 22. As shown in FIG. 3, the lower end of the plate member 23 is bent so that the slant guiding surface 23b is provided for guiding the end of the engaging pin 22 to the engaging hole 23a. Upon turning the arm 13 to the measuring position B, the handle 21 is pulled to the direction shown with the arrow (FIG. 3) against the urging force of the spring so that the engaging pin 22 is disengaged from the engaging hole 23a.

Operation of the aforementioned cutting edge measuring device will be described.

With the movement of the headstock 7 to the X-axis and the Z-axis directions, the chuck 7a receives a workpiece W which has been indexed on the work stocker at a predetermined position. The chuck 7a holding the workpiece W then moves toward the tool rest 8 by the movement of the headstock 7 in the X-axis direction.

Prior to machining the workpiece W by the tool T positioned in the cutting and processing position, measurement of the cutting edge position for the tool T is carried out with the use of the cutting edge measuring device. The operator holds and pulls the handle 21 against the urging force of the spring (not shown), thereby disengaging the engaging pin 22 from the engaging hole 23a of the plate member 23, and then turns the arm 13 from the retracting position A to the measuring position B. With the turning movement of the arm 13, the engaging member 17 of the notch mechanism 15 disengages from the notch 16a of the notched plate 16, and when the arm 13 is turned through 90°, the engaging member 17 again engages with another adjacent notch 16a and the stopper 27b abuts against the abutting portion 28b. The measuring portion 14 is precisely positioned at the measuring position B since the engaging member 17 comes into engagement with the notch 16a by the urging action of the spring 18 and the stopper 27b abuts against the abutting portion 28b.

When so positioned, sensors 14a are located within the vertical plane including both the axis of the main spindle C and the X-axis just above the cutting edge of the tool T. Therefore, when the motor M1 is actuated and the headstock 7 moves downwards along the guide rail 5a, the sensor 14a contacts with the cutting edge of the tool T (FIG. 3) and transmits detecting signals. The control unit then calculates the cutting edge position of the tool T based on the position data of the headstock 7 from the detecting signals. When the measurement of the cutting edge of the tool T is completed, the headstock 7 moves upwardly in the reverse order. Then, the operator turns the arm 13 toward the retracting position A. At the retracting position A, since the measuring portion 14 is retracted within the protecting means 25, the measuring portion 14 and the sensors 14*a* are not subject to chips or coolant splashing during machining. Further, turning movement of the arm 13 is restricted in this position since the engaging pin 22 engages with the engaging hole 23*a* of the plate member 23.

Although the present invention has been described in its preferred embodiment, it is to be understood that the invention is not limited to the specific embodiment. For example, instead of the manually operated arm 13, an automatically operated arm having driving means such as rotary actuator or cylinder/rack-and-pinion mechanism may be employed so that the movement of the arm is automatically controlled between the retracting position A and the measuring position B based on the operation signals from the control unit. Also, instead of the arm 13 turning around the shaft 12 between the retracting position A and the retracting position B, a linearly movable measuring portion may be used so that the measuring portion 14 having sensors 14*a* is linearly displaceable between the retracting position A and the measuring position B.

In the preferred embodiment, turning movement of the arm 13 is restricted by the engagement between the engaging pin 22 and the engaging hole 23*a* of the plate member 23, however, other means may be employed as long as the turning movement of the arm 13 is restricted. For example, a rotational movement restricting pin may be inserted into the shaft 12 for preventing the turning movement of the arm 13.

The positioning means for positioning and retaining the arm 13 at the retracting position A and the measuring position B has been described as constructed by the notch mechanism 15, stoppers 17*a*, 27*b*, abutting portions 28*a*, 28*b* and the like, however, other means may be employed as long as the arm 13 is precisely positioned at the retracting position A and the measuring position B. For example, the arm attachment member 11 is provided with magnet means so as to attract the arm 13 in the respective positions. Precise positioning of the measuring portion 14 at the retracting position A is not necessary. Therefore, provision of the stopper 27*a* and the abutting portion 28*a* may be dispensable.

The sensors 14*a* have been described as contact-type sensors, however, non-contact-type sensors may be employed. Sensors may be of any other type detecting the cutting edge position of the tool T and transmitting the detecting signals.

Also the number of the sensors 14*a* may vary. In the preferred embodiment, four sensors 14*a* are provided on the measuring portion 14 at four different sides, however, one or two sensor(s) having four contacting portions at the respective sides may be employed.

According to the present invention, since contact-type or non-contact-type detecting means is provided in offset position from the axis of the main spindle and is movable between the retracting position A and the measuring position B, measurement of the cutting edge position is carried out while a workpiece is chucked in the main spindle. Also, since the measuring point of the cutting edge is visible from the operator and the measuring of the cutting edge is carried out with the tool indexed to the cutting and processing position, the cutting edge measuring device of the invention excels in operational performance and measuring accuracy. Moreover, construction of the measuring device is simple, which is unlikely to suffer from troubles and is easy for maintenance. Because of the protecting means, the cutting edge measuring device is not subject to chips or coolant splashing during machining.

What is claimed is:

1. A cutting edge measuring device used for a machine tool, which machine tool including:

a main spindle perpendicular to or tilting at predetermined angles to the horizontal plane;

a headstock rotatably mounting the main spindle and movable on a bed along the axis of the main spindle and the axis perpendicular thereto;

a chuck provided at the lower end of the main spindle so as to grip a workpiece; and a tool rest provided on the bed under the chuck and having tools mounted thereon for cutting and processing the workpiece gripped by the chuck, wherein the cutting edge measuring device comprises:

an arm provided on said headstock and movable between the retracting position at which the arm does not interrupt said workpiece and the working tool and the measuring position at which measurement is carried out for the cutting edge of the tool;

detecting means mounted on said arm and detecting the cutting edge of the tool at a position away from the axis of the main spindle with contacting or non-contacting fashion so as to transmit detecting signals; and positioning means for positioning and retaining said arm at the measuring position.

2. A cutting edge measuring device according to claim 1, characterized in that said arm is supported on the headstock so as to be movable around the axis perpendicular to that of the main spindle, and that said retracting position is near the headstock and said measuring position is near the tool rest.

3. A cutting edge measuring device according to claim 1, characterized in that said detecting means is located at the measuring position within the vertical plane including both the axis of the main spindle and the axis perpendicular thereto, and is away from the axis of the main spindle at a predetermined distance.

4. A cutting edge measuring device according to any one of claim 1, characterized in that said detecting means is located at the measuring position within the vertical plane including both the axis of the main spindle and the axis perpendicular thereto, and is away from the axis of the main spindle at a distance more than the outer diameter of the chuck.

5. A cutting edge measuring device according to any one of claim 1 characterized in that said arm is a linear member substantially parallel to the axis of the main spindle.

6. A cutting edge measuring device according to any one of claim 1, characterized in that restriction means is provided so that the arm is firmly hold at the retracting position.

7. A cutting edge measuring device according to any one of claim 1, characterized in that protecting means is provided at the retracting position so as to receive therein the detecting means.

8. A cutting edge measuring device according to any one of claim 1, characterized in that said tool rest is indexed its position around the axis perpendicular to that of the main spindle and that said tool rest is provided with a disk-like turret having a plurality of equi-spaced tools around the periphery thereof.

9. A cutting edge measuring device according to any one of claim 1, characterized in that measurement of the cutting edge is carried out by the movement of said headstock at least toward the axis of the main spindle and the axis perpendicular to that of the main spindle.

10. A cutting edge measuring device used for a machine tool, which machine tool including:

- a main spindle perpendicular to or tilting at predetermined angles to the horizontal plane;
- a headstock rotatably mounting the main spindle and movable on a bed at least along the axis of the main spindle and the axis perpendicular thereto;
- a chuck provided at the lower end of the main spindle so as to grip a workpiece; and
- a tool rest provided on the bed under the chuck and having tools mounted thereon for cutting and processing the workpiece gripped by the chuck, wherein the cutting edge measuring device comprises:

- an arm attachment member provided on said headstock in a position offset from the axis of the main spindle toward said tool rest;
- an arm attached to said arm attachment member and movable between the retracting position at which the arm does not interrupt the workpiece and the working tool and the measuring position near said tool rest at which measurement is carried out for the cutting edge of the tool; and
- detecting means provided on said arm at the end remote from the arm attachment member and detecting the cutting edge of the tool at a position away from the axis of the main spindle with contacting or non-contacting fashion so as to transmit detecting signals.

* * * * *